(12) United States Patent
Shnaiwer et al.

(10) Patent No.: US 9,237,578 B1
(45) Date of Patent: Jan. 12, 2016

(54) SPECTRUM ALLOCATION SCHEME FOR FEMTOCELLS

(71) Applicant: King Fahd University of Petroleum and Minerals, Dhahran (SA)

(72) Inventors: Yousef Naief Shnaiwer, Dhahran (SA); Salam Adel Zummo, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/468,986

(22) Filed: Aug. 26, 2014

(51) Int. Cl.
*H04Q 11/00* (2006.01)
*H04W 72/08* (2009.01)

(52) U.S. Cl.
CPC .................................. *H04W 72/082* (2013.01)

(58) Field of Classification Search
CPC .................................................. H04W 72/082
USPC ........................................... 455/452.1, 435.1
See application file for complete search history.

(56) References Cited

U.S. PATENT DOCUMENTS

| | | | |
|---|---|---|---|
| 2012/0115498 | A1 | 5/2012 | Kim et al. |
| 2014/0080535 | A1* | 3/2014 | Gauvreau et al. ............. 455/513 |
| 2014/0162585 | A1* | 6/2014 | Bose et al. ................. 455/404.1 |

FOREIGN PATENT DOCUMENTS

KR    10-2010-0089193    8/2010

OTHER PUBLICATIONS

Xin Tao, et al., "Downlink Interference Minimization in Cognitive LTE-Femtocell Networks", Jul. 2013, (6 pages).
Gang Ning, et al., "Macro- and Femtocell Interference Mitigation in OFDMA Wireless Systems", Globecom 2012—Wireless Communication Symposium, (6 pages).

* cited by examiner

*Primary Examiner* — Qutbuddin Ghulamali
(74) *Attorney, Agent, or Firm* — Oblon, McClelland, Maier & Neustadt, L.L.P.

(57) ABSTRACT

A method of mitigating an interference and reducing costs resulting from a co-existence of a plurality of femtocells and a plurality of macrocells. The method groups the femtocells into groups of non-interferers based on the distances between a plurality of femtocell base stations and a cognitive radio network base station, wherein the distances are calculated based on the locations of a plurality of grouped femtocell base stations. The method accrues a revenue of the profit of the cognitive radio network base station from a plurality of K femto base stations and a plurality of I macro secondary user subscribers while paying only for a plurality of S non-interfering groups of the plurality of femto base stations plus the I macro secondary user subscriber channels.

20 Claims, 6 Drawing Sheets

SPECTRUM ALLOCATION SCHEME FOR FEMTOCELLS

BACKGROUND

The description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The need for energy-efficient or green communication solutions is inevitably increasing (Y. Chen, S. Zhang, S. Xu, and G. Y. Li, "Fundamental trade-offs on green wireless networks," Commun. Mag. IEEE, vol. 49, no. 6, pp. 30-37, 2011, incorporated herein by reference). Femtocells have been proposed as an energy-efficient solution, which enhance coverage and data rates in addition to maintaining the energy consumption of mobile sets and macrocells at a reasonable level. What makes femtocells an energy efficient technology is the reduction in the distance between the indoor users. This enables the base station to multitask more efficiently and also helps the macrocell to focus on outdoors mobile users (V. Chandrasekhar, J. Andrews, and A. Gatherer, "Femtocell networks: a survey," Commun. Mag. IEEE, vol. 46, no. 9, pp. 59-67, 2008, incorporated herein by reference).

Another technology that can be used to increase the energy and spectrum efficiency of wireless networks is the use of cognitive radio (D. Grace, J. Chen, T. Jiang, and P. D. Mitchell, "Using cognitive radio to deliver 'Green' communications," in Cognitive Radio Oriented Wireless Networks and Communications, 2009. CROWNCOM '09.4th International Conference on cognitive radio wireless networks, 2009, pp. 1-6, incorporated herein by reference).

A cognitive radio is an intelligent radio that can be programmed and configured dynamically. It can be a self-organized radio which has the ability to change its operating frequency according to the changes in the surrounding environment, and by doing so, it exploits the spectrum holes to increase its choices of bandwidth (S. Haykin, "Fundamental Issues in Cognitive Radio," in Cognitive Wireless Communication Networks, E. Hossain and V. Bhargava, Eds. Springer US, 2007, pp. 1-43, incorporated herein by reference). One such way that cognitive radios can be effective with regard to bandwidth choices is that by increasing the bandwidth, the energy usage can be decreased because network capacity increases linearly with bandwidth and logarithmically with power (D. Grace, J. Chen, T. Jiang, and P. D. Mitchell, "Using cognitive radio to deliver 'Green' communications," in Cognitive Radio Oriented Wireless Networks and Communications, 2009. CROWNCOM '09. 4th International Conference on cognitive radio wireless networks, 2009, pp. 1-6, incorporated herein by reference).

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one illustrative embodiment there may be a method for mitigating interference and reducing spectrum costs, including initializing at least one ungrouped femtocell base station, initializing a location index corresponding to the location of the ungrouped femtocell base station, initializing a grouping index of the at least one ungrouped femtocell base station to an initial value, initializing a first group and setting a grouping index of the initialized first group to the initial value, assigning the at least one ungrouped femtocell base station to the first group, setting the grouping index of the grouped femtocell base station to a non-initial value, selecting at least one other ungrouped femtocell base station for evaluation, assigning the at least one other ungrouped femtocell base station to the first group if the distance between the grouped femtocell base station and the at least one other ungrouped femtocell base station is larger than a threshold distance value, and setting a grouping index of the at least one other ungrouped femtocell base station to the non-initial value.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

Figure 1:
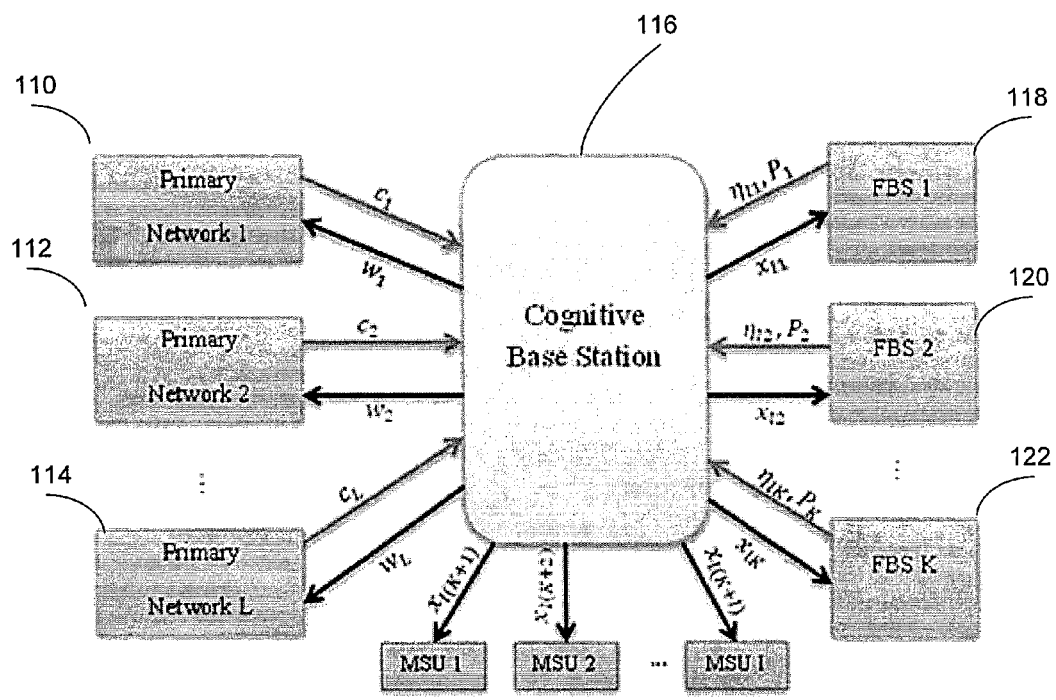
FIG. 1 depicts a general system model according to one example that includes L number of primary networks (PU) networks and one secondary user network with one cognitive base station serving I Macrocell Secondary Users (MSUs) and K Femto Base Stations (FBSs)

The description provided here is intended to enable any person skilled in the art to understand, make and use this invention. Various modifications to the disclosed embodiments will be readily apparent to those skilled in the art, and the general principals defined herein may be applied to these modified embodiments and applications without departing from the scope of this invention. In each of the embodiments, the various actions could be performed by program instruction running on one or more processors, by specialized circuitry or by a combination of both. Moreover, the invention can additionally be considered to be embodied, entirely or partially, within any form of computer readable carrier containing instructions that will cause the executing device to carry out the technique disclosed herein. The present invention is thus, not intended to be limited to the disclosed embodiments, rather it is be accorded the widest scope consistent with the principles and features disclosed herein.

Details of functions and configurations well known to a person skilled in this art are omitted to make the description of the present invention clear. The same drawing reference numerals will be understood to refer to the same elements throughout the drawings.

Although the description and discussion were in reference to certain exemplary embodiments of the present disclosure, numerous additions, modifications and variations will be readily apparent to those skilled in the art. The scope of the invention is given by the following claims, rather than the preceding description, and all additions, modifications, variations and equivalents that fall within the range of the stated claims are intended to be embraced therein.

In one exemplary embodiment, the scenario of a cognitive radio network with femtocells is explored, which provides a solution that will help a secondary user network survive under high spectrum prices by significantly reducing spectrum costs which will result in a much higher profit for the secondary user network.

Figure 5:
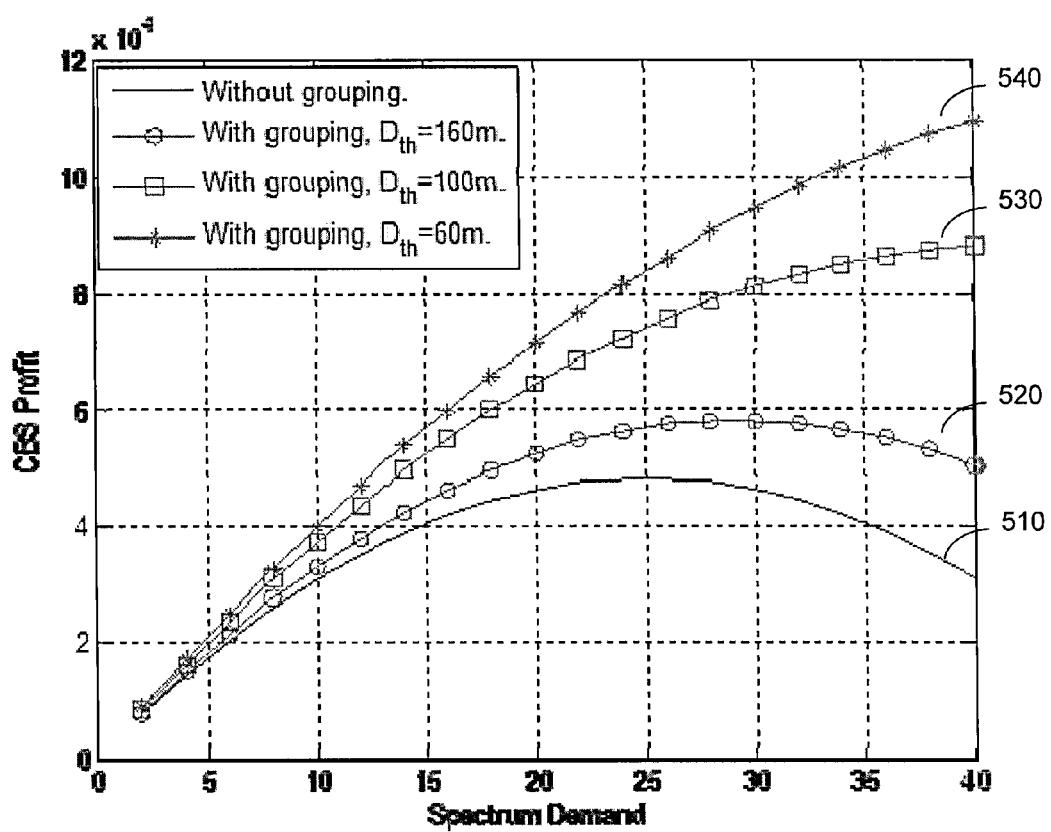
FIG. 5 shows the profit of cognitive radio network base station (CBS) as a function of the spectrum demand for different value of the distance threshold in according to one example.

Some non-limiting embodiments of the present disclosure are as follows. First, a Global Positioning System (GPS)-assisted algorithm to reduce the required spectrum to be purchased from primary user networks (PU) networks for femtocells by grouping the femtocells into groups of non-interferers based on the distances between them is provided. Second, the effect of the grouping on the spectrum allocation process is identified, and a spectrum allocation algorithm based on the sum of energy efficiencies of the groups is provided. FIG. 5, described further below, illustrates the effect of applying the scheme on the profit of the CBS.

Most of the existing literature that address the cognitive radio and femtocell technologies focus on the usage of the cognitive radio concept to mitigate the interference resulting from the co-existence of femtocells and macrocells in the same area utilizing the spectrum band (M. E. Sahin, I. Guvenc, M.-R. Jeong, and H. Arslan, "Handling CCI and ICI in OFDMA femtocell networks through frequency scheduling," IEEE Trans. Consum. Electron., vol. 55, no. 4, pp. 1936-1944, November, incorporated herein by reference, and A. Adhikary, V. Ntranos, and G. Caire, "Cognitive femtocells: Breaking the spatial reuse barrier of cellular systems," in Information Theory and Applications Workshop (ITA), 2011, February, pp. 1-10, incorporated herein by reference, and S. Al-Rubaye, A. Al-Dulaimi, and J. Cosmas, "Cognitive Femtocell," IEEE Veh. Technol. Mag., vol. 6, no. 1, pp. 44-51, March, incorporated herein by reference, and S.-Y. Lien, Y.-Y. Lin, and K.-C. Chen, "Cognitive and Game-Theoretical Radio Resource Management for Autonomous Femtocells with QoS Guarantees," IEEE Trans. Wirel. Commun., vol. 10, no. 7, pp. 2196-2206, July, incorporated herein by reference, and W. Wang, G. Yu, and A. Huang, "Cognitive radio enhanced interference coordination for femtocell networks," IEEE Commun. Mag., vol. 51, no. 6, p.-, 2013, incorporated herein by reference, and S.-M. Cheng, W.-C. Ao, F.-M. Tseng, and K.-C. Chen, "Design and Analysis of Downlink Spectrum Sharing in Two-Tier Cognitive Femto Networks," IEEE Trans. Veh. Technol., vol. 61, no. 5, pp. 2194-2207, 2012, incorporated herein by reference, and P. Palanisamy and S. Nirmala, "Downlink interference management in femtocell networks—a comprehensive study and survey," in 2013 International Conference on Information Communication and Embedded Systems (ICICES), 2013, pp. 747-754, incorporated herein by reference, and J. Xiang, Y. Zhang, T. Skeie, and L. Xie, "Downlink Spectrum Sharing for Cognitive Radio Femtocell Networks," IEEE Syst. J., vol. 4, no. 4, pp. 524-534, 2010, incorporated herein by reference, and L. Huang, G. Zhu, and X. Du, "Cognitive femtocell networks: an opportunistic spectrum access for future indoor wireless coverage," IEEE Wirel. Commun., vol. 20, no. 2, pp. 44-51, 2013, incorporated herein by reference).

Cognitive radio networks purchase the required spectrum from PU networks may rely on multiple theories. In (R. Xie, F. R. Yu, H. Ji, and Y. Li, "Energy-Efficient Resource Allocation for Heterogeneous Cognitive Radio Networks with Femtocells," IEEE Trans. Wirel. Commun., vol. 11, no. 11, pp. 3910-3920, 2012, incorporated herein by reference) a scenario for heterogeneous cognitive radio networks with femtocells is studied. The authors use game theory to model the interactions between the PU networks, the cognitive radio network base station (CBS) and the femtocell base stations (FBS's). A competition game model is used to describe the relationships between the PU networks, in which each PU network is trying to maximize its profit by increasing/decreasing the price per spectrum band while taking into account the prices offered by the other PU networks. The cognitive radio network base station (CBS) purchases spectrum bands/channels from the PU networks and allocates them directly to one femtocell base station (FBS) or macrocell secondary user (MSU) to maximize its profit. Two situations may cause problems for the CBS in such a scenario. The first situation is when the PU networks are playing a collusion game (D. Niyato and E. Hossain, "Competitive Pricing for Spectrum Sharing in Cognitive Radio Networks: Dynamic Game, Inefficiency of Nash Equilibrium, and Collusion," IEEE J. Sel. Areas Commun., vol. 26, no. 1, pp. 192-202, 2008, incorporated herein by reference). All the PU networks will offer the price that maximizes their profits, the Pareto-efficient price, and this will affect the CBS by forcing it to accept the highest possible price because no other prices are offered.

The second situation is when the spectrum band offered by the PU networks is not enough to serve the users of the CBS, which is possible taking into account the high data rate demands of mobile users.

In both of the situations described above, the CBS should find a way to manage the available spectrum more efficiently such that the number of the spectrum channels needed to be purchased is minimized.

Methodology:

In this section, the system model is explained, the grouping process and the resultant spectrum allocation algorithm are presented and illustrated, and the CBS profit as a result of applying the scheme is derived.

The System Model:

FIG. 1 depicts the general system model used in the present disclosure which includes any number of PU networks such as primary network 1 (110), primary network 2 (112) up to L primary network (114) and one secondary user (SU) network as represented, in part, by cognitive radio network base station (CBS) 116. Although the design of the present disclosure can include a plurality of SU macrocell networks, only one SU macrocell network is considered as an illustration of an embodiment of the disclosure. Other embodiments may group the SU macrocells together under one group as to take them out of the grouping schemes discussed further below. The SU macrocell consists of the CBS 116 and which is configured to communicate with users that include femtocell base stations (FBS) 118 (as represented by FBS 118-122) and macrocell secondary user (MSU's). There are K FBS's and I MSU's in the network, so the total number of users is K+I. Each FBS has a built-in global positioning system (GPS) receiver (GPS is already built in FBS's (K. M. Pesyna, K. D. Wesson, R. W. Heath, and T. E. Humphreys, "Extending the reach of GPS-assisted femtocell synchronization and localization through Tightly-Coupled Opportunistic Navigation," in 2011 IEEE GLOBECOM Workshops (GC Wkshps), 2011, pp. 242-247, incorporated herein by reference), and "Enterprise Multi-Femtocell Deployment Guidelines." Qualcomm Incorporated, June-2011, incorporated herein by reference).

In one example, using the built-in GPS system, each FBS sends its location ($P_1$-$P_k$) to the CBS and thus allows the CBS to initialize a set of locations ($P_1$-$P_k$) for the FBS. The FBS may use other built in systems that can enable it to calculate its location, including but not limited to Global Posititioning Systems (GPS), geographic information system (GIS) and triangulation based cellular network systems. It is assumed here that there exists an interface between FBS's and CBS (e.g. X2 interface as argued in (A. Galindo-Serrano and L. Giupponi, "Distributed Q-Learning for Interference Control in OFDMA-Based Femtocell Networks," in Vehicular Technology Conference (VTC 2010-Spring), 2010 IEEE 71st, 2010, pp. 1-5, incorporated herein by reference, and A. Galindo-Serrano, L. Giupponi, and M. Dohler, "Cognition and Docition in OFDMA-Based Femtocell Networks," in 2010 IEEE Global Telecommunications Conference (GLOBECOM 2010), 2010, pp. 1-6, incorporated herein by reference, and A. Galindo-Serrano and L. Giupponi, "Downlink femto-to-macro interference management based on Fuzzy Q-Learning," in 2011 International Symposium on Modeling and Optimization in Mobile, Ad Hoc and Wireless Networks (WiOpt), 2011, pp. 412-417, incorporated herein by reference, and S. Oh, H. Kim, B. Ryu, and N. Park, "Inbound Mobility Management on LTE-Advanced Femtocell Topology Using X2 Interface," in 2011 Proceedings of 20th International Conference on Computer Communications and Networks (ICCCN), 2011, pp. 1-5, incorporated herein by reference, and W. Liu, C. Hu, D. Wei, M. Peng, and W. Wang, "An overload indicator amp; high interference indicator hybrid scheme for inter-cell interference coordination in LTE system," in 2010 3rd IEEE International Conference on Broadband Network and Multimedia Technology (ICBNMT), 2010, pp. 514-518, incorporated herein by reference, and R. Combes, Z. Altman, M. Haddad, and E. Altman, "Self-Optimizing Strategies for Interference Coordination in OFDMA Networks," in 2011 IEEE International Conference on Communications Workshops (ICC), 2011, pp. 1-5, incorporated herein by reference) or through wired backhaul as suggested in J.-H. Yun and K. G. Shin, "Adaptive Interference Management of OFDMA Femtocells for Co-Channel Deployment," IEEE J. Sel. Areas Commun., vol. 29, no. 6, pp. 1225-1241, June, incorporated herein by reference). The CBS will allocate each user a spectrum channel/band by setting the spectrum allocation index ($X_{1k}$ for FBS's and $X_{1(K+i)}$ for MSU's) of that user to a value of one. Each FBS serves only registered users (closed access mode (V. Chandrasekhar, J. Andrews, and A. Gatherer, "Femtocell networks: a survey," Commun. Mag. IEEE, vol. 46, no. 9, pp. 59-67, 2008, incorporated herein by reference).

In the present embodiment, assumptions can be made to simplify the design concept. First, all the FBS's and the MSU's pay the same cost to the CBS (set to one to completely ignore the effect of the different costs paid by the SU's on the profit of CBS). Second, the MSU's will be assigned orthogonal channels to those assigned to the groups of FBS's, and they will not be part of the grouping process. Third, the grouping process is performed by the CBS before purchasing the spectrum. This means that the CBS will purchase the number of spectrum bands that satisfies the needs of the non-interfering groups and the MSU's. The CBS will not pay additional costs for surplus spectrum bands. Fourth, it is assumed that each FBS serves only one user. Finally, we assume that the number of spectrum bands offered by the primary networks satisfies the number of non-interfering groups and MSU's in the network. In one exemplary embodiment, each FBS (k) will find the energy efficiency of its user using the gain information sent by that user, and send it to the CBS. The energy efficiency of user transmission for the k'th FBS can be expressed by the following formula, also included in (R. Xie, F. R. Yu, H. Ji, and Y. Li, "Energy-Efficient Resource Allocation for Heterogeneous Cognitive Radio Networks with Femtocells," IEEE Trans. Wirel. Commun., vol. 11, no. 11, pp. 3910-3920, 2012, incorporated herein by reference)

$$\eta_k = \frac{\log_2\left(1 + \frac{h_k^2 p_k}{\sigma^2}\right)}{p_a + p_k}, \quad (1)$$

In equation 1, $h_k$ is the gain from the femtocell secondary user (FSU) to the FBS, $p_k$ is the energy efficient power allocation for each FSU, $\sigma^2$ is the noise power assuming an Additive White Gaussian Noise (AWGN) noise with a zero mean, and $p_a$ is the additional circuit power consumption during transmission (S. Cui, A. J. Goldsmith, and A. Bahai, "Energy-efficiency of MIMO and cooperative MIMO techniques in sensor networks," IEEE J. Sel. Areas Commun., vol. 22, no. 6, pp. 1089-1098, 2004, incorporated herein by reference)

The Grouping Process:

In an exemplary embodiment, a process is deployed to group non-interfering femtocells together to enable enhanced spectrum allocation within the network and between the cognitive radio network base station (CBS) and the femtocells base stations (FBS). The grouping process may be summarized as follows. After the CBS has received all the locations of the FBS's ($P_1$-$P_k$), it will find the distance between each two FBS's. The CBS will start by putting the first FBS (the FBS with k=1) in the first groups. After that, the second FBS will be compared to the first FBS, if the distance between them is larger than a certain threshold, denoted by $D_{th}$, then the second FBS will be assigned to the first group. Otherwise, it will not be grouped and the CBS examines the next FBS. The process continues the same way until the last FBS is examined. Each FBS is put in a group if it has its distance to all the FBS's in that group higher than $D_{th}$. When all FBSs are examined for the first group, the CBS starts again from the ungrouped FBS and assigns it to the second group. Each time the CBS initializes a new group with the first ungrouped FBS, the CBS assigns all the FBSs satisfying the distance threshold condition to that group. This is summarized in Algorithm 1.

Algorithm 1: The Grouping Process:
1) Initialization: The set of FBS's $\Omega_K$=1, 2, . . . , K, the set of their locations $\{(X_k, Y_k)\}_{k=1}^{K}$, and the set of grouping indices G=$\{g_1, g_2, \ldots, g_K\}$.
2) Set s=1.
3) Do repeat:
   a) Denote the number of FBS's in group s by $U_s$ and set $U_s$ to zero.
   b) Find the first FBS k with grouping index $g_k$=0 and put it in group s,
   c) Set n=k+1, and $U_s$=$U_s$+1,
   d) Do repeat:
      i) Find the distance between the first first ungrouped FBS n (with $g_n$=0) and all the FBS's in group s $\{D_{ni}\}_{i=1}^{U_s}$,
      ii) If $\{D_{ni}\}_{i=1}^{U_s}$>$D_{th}$ then put FBS n in group s.
      iii) Set $U_s$=$U_s$+1, end if
      iv) Set n=n+1,
      Until n=K+1, end repeat.
   e) Set s=s+1,
      Until all elements in G equal 1, end repeat.
4) Output the groups and the indexes of their FBS's.

Figure 2:
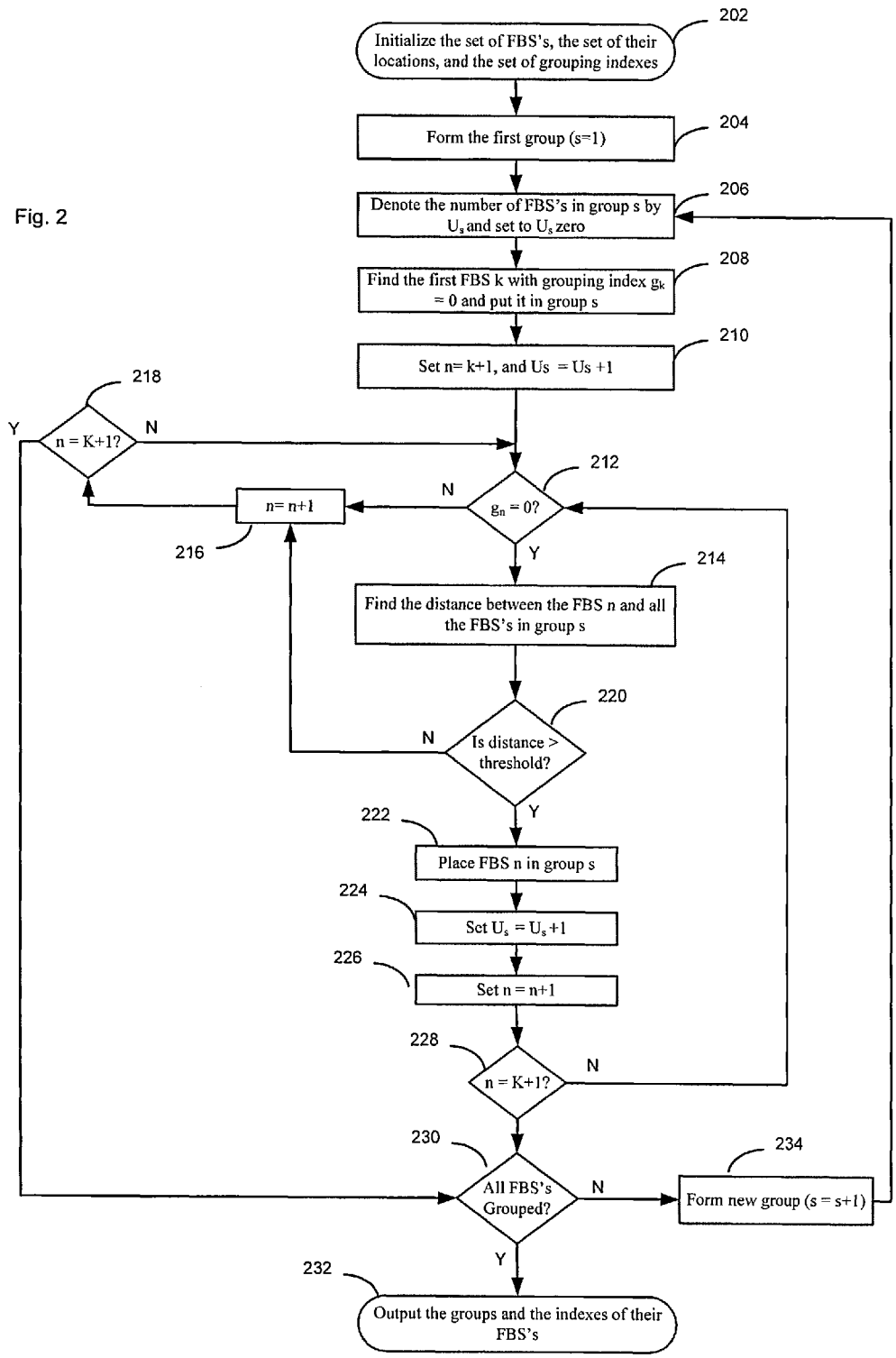
FIG. 2 illustrates a flow chart to determine grouping mechanism for grouping femtocells according to one example.

FIG. 2 depicts a flowchart outlining an exemplary embodiment of the grouping process utilized by the cognitive radio network system.

The process begins at step 202 wherein the system initializes a set of femtocell base stations (FBS), initializes a set of their locations, and the set of grouping indices. It can be understood that the initialization phase allows the cognitive radio network to determine the number of FBS's in the vicinity and their locations. The number of groups is not predetermined, but rather the algorithm continues to loop and terminates when all the FBSs are grouped. The system then forms the first group in step 204 by setting s to 1, which will later be incremented to allow for the formation of new groups. In step 206, the cognitive radio network further denotes $U_s$ as the initial number of FBS's in the group and initializes that value to zero since the group is initially empty. For each FBS assigned to the group, this number is incremented by one. The number of FBS's in the group determines the maximum number of comparisons needed for the next examined FBS.

In step 208 the cognitive radio network searches and locates the first FBS (k) that has a grouping index $g_k=0$ and places the FBS (k) in group (s). The grouping index of this FBS is then set to one, which indicates that this FBS belongs to a group and will not be considered for further grouping.

In step 210, the number of FBSs in group (s) ($U_s$) is increased by one as a result of assigning the $k^{th}$ FBS to the group. This number is increased each time a new FBS is added to the group to indicate the number of comparisons needed for the next examined FBS. The CBS initializes a counter (n) for the remaining FBSs to be examined in step 212. A result of assigning each additional femtocell base station to the group allows for the determination of the maximum number of comparisons needed for the next examined femtocell base station.

In step 214, the system finds the distance between nth FBS and all FBSs in the selected group (s). This distance information will help the CBS to determine whether this FBS satisfies the distance threshold or not for group (s). In step 220, if it is determined that the distance between the FBS n and other FBSs in the group is smaller than a threshold distance $D_{th}$, then the FBS n is not assigned to group s, and the CBS examines the next FBS by increasing n by 1 at step 216, ensuring that not all the FBSs have been examined for group s (at step 218) and that the FBS n is not grouped (at step 212), and returning to step 214. It is an embodiment of the present disclosure to filter the FBSs by distance using a "greater than" mechanism to enable the system to remove the interfering FBS's from any group, such as group (s), and allow for each group to have all non-interfering FBSs. As such, wherein the distance between FBS n and any other FBS in group (s) is determined to be the below threshold distance $D_{th}$, the system can determine a greater likelihood of interference between the FBSs and would not place the FBS in group (s). In such instances, it would be determined that FBS n would need to be placed in a different group. The FBS that does not satisfy the distance threshold condition for group (s) will not be assigned to any other group until all the other ungrouped FBSs are examined for group (s). When all the FBSs are examined for group (s), a new group (s+1) is formed by the CBS and al the remaining ungrouped FBSs will be examined for the newly-formed group as illustrated by steps 222-226. This process is repeated, forming new groups and assigning FBSs to them, until all the FBSs are grouped.

In step 222, and upon a determination that the distance between FBS n and all other FBSs within group (s) is greater than threshold distance $D_{th}$, FBS n is placed in group (s). In step 224, the system increments the group number $U_s$ to $U_s+1$ to indicate the addition of one more FBS to the group. In step 226, the CBS moves to the next ungrouped FBS. As illustrated further in step 228, if the examined FBS is not the last one (i.e., n<K+1) the CBS examines whether the FBS n is grouped or not from its grouping index. If the FBS is grouped ($g_n=1$), the CBS moves to the next FBS as illustrated by steps 216 and 218. If the FBS n is ungrouped (e.g. $g_n=0$), the CBS returns to step 214 to examine whether the FBS can be assigned to group (s) or not.

In one embodiment, the initial ungrouped FBSs may be categorized as ungrouped femtocell base stations such that when an ungrouped femtocell base station is later selected and grouped, it may be categorized as a grouped femtocell base station. The grouped femtocell base station nomenclature reflects the categorization of the femtocell and is not reflective of any differences in physical performance or parameters. For example, the grouping mechanism may further derive a set of grouped femtocell base stations from the initialized set of ungrouped femtocell base stations wherein the grouping is created by continuously deriving, from the initialized ungrouped femtocell base stations, different grouped femtocell base stations to be placed into grouped femtocell base station groups.

In the event where n=K+1, i.e., all the FBSs have been examined for group (s), the CBS checks 230 whether all the FBSs are grouped or not. If all the FBSs are grouped, then the algorithm outputs 232 the groups and their members and terminates. Otherwise, the CBS forms a new group (s=s+1) and returns to step 206 to assign FBSs to the newly formed group.

The grouping algorithm illustrated in FIG. 2 ensures that at the end of the grouping process, each FBS in the network is a member in a group, and is allocated the channel/band assigned to that group. The most important parameter here is the $D_{th}$ which may be alternatively defined as the distance above which two users are considered non-interferers.

Figure 3:
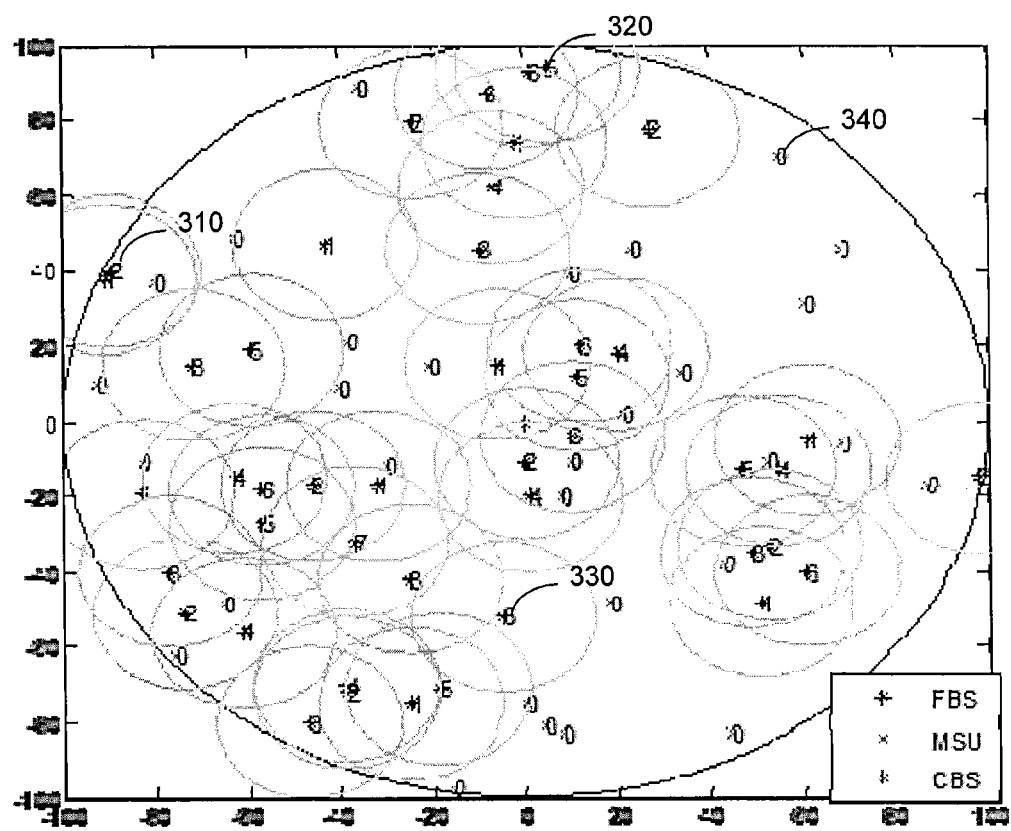
FIG. 3 shows a sample of the grouping result according to one example.

A sample result of a grouping process using a 50 meter threshold distance $D_{th}$ is shown in FIG. 3. Here, the total number of subscribers is 75, and the number of FBS's is 45 or ⅗ of the total number of subscribers. The resultant number of groups is 7. For example, the 45 FBSs are categorized under different group numbers, such as group 310 (group 2) or group 320 (group 5) or group 330 (group 6).

It may be noticed from FIG. 3 that all the MSU's are put in one group, group 340 (group 0). This does not mean that they all share the same channel, but it means that they are not part of the grouping process. It should be emphasized here that each MSU is assigned a channel which is orthogonal to all other MSU's and FBS groups. In this example, the use of the disparate orthogonal channels to each MSU allows for reduced interference between the channels and improves the spectrum allocation process.

Reduced interference and improved spectrum allocation allows for increase in profits for more efficient systems. In one exemplary embodiment, a cognitive radio base station (CBS) may be able to increase profits by manipulating certain parameters of the grouping mechanism. This will be further illustrated below and allows for yet further increased efficiency of the system. In one example, the cognitive radio base station (CBS) may increase its profits by decreasing the threshold distance. A smaller $D_{th}$ means that it will be easier to put more users in each group which will result in decreasing the number of groups. As a result of the decreased number of groups, the number of purchased spectrum bands will decrease and, consequently, the profit of the CBS will increase. In order to determine the number of decreased groups, the CBS may run an analysis to determine a minimum group requirement that would not allow for potentially interfering FBSs to be in the same grouping. As such, a CBS that is configured to increase profits may need to weigh the increase in potential profits per each number of groups that is reduced versus any decreases in the quality of services (QoS). One example of how a CBS can make that determination is by ensuring that the CBS will need to weigh the signal-to-interference-plus-noise ratio (SINR) is not lower than a certain predetermined value. In one example, the predetermined SINR value may be dependent on the required maximum throughput of the system.

The Spectrum Allocation Algorithm:

Before discussing the algorithm of the present disclosure, the present disclosure briefly reviews the spectrum allocation algorithm proposed in (R. Xie, F. R. Yu, H. Ji, and Y. Li, "Energy-Efficient Resource Allocation for Heterogeneous Cognitive Radio Networks with Femtocells," IEEE Trans. Wirel. Commun., vol. 11, no. 11, pp. 3910-3920, 2012, incorporated herein by reference). In one embodiment, there may be a set of L channels from L primary networks, I MSU's, and K FBS's. Each FBS sends its energy efficiency to the CBS, and the CBS finds the energy efficiencies of the MSU's. The CBS will start from the FBS/MSU with the highest energy efficiency and assigns to it the spectrum band with the lowest cost to maximize its profit. This process continues until the entire available spectrum bands are allocated. It is assumed that the number of spectrum bands is equal to the number of the MSU's and FBS's. The present disclosure adopts this assumption for comparison purposes.

In yet another embodiment, the CBS allocates the spectrum band only to one MSU/FBS by setting the index parameter of it to 1. The rationale behind allocating one spectrum only to one MSU/FBS (according to R. Xie, F. R. Yu, H. Ji, and Y. Li, "Energy-Efficient Resource Allocation for Heterogeneous Cognitive Radio Networks with Femtocells," IEEE Trans. Wirel. Commun., vol. 11, no. 11, pp. 3910-3920, 2012, incorporated herein by reference) is to avoid interference. The same idea is adopted here for the MSU's. However, for the FBS's the approach will be different. So assuming that the CBS have purchased the orthogonal channels to serve the MSU's (serving MSU's is usually a priority for operators (J.-H. Yun and K. G. Shin, "Adaptive Interference Management of OFDMA Femtocells for Co-Channel Deployment," IEEE J. Sel. Areas Commun., vol. 29, no. 6, pp. 1225-1241, June, incorporated herein by reference) according to their energy efficiencies, the CBS will start to purchase spectrum for the FBS's.

After the CBS purchases the spectrum for the FBS's the question to be addressed is how the CBS assigns the channels to the groups of FBS's. The answer is simple, since each group has several FBS's, then the CBS should assign the channel/band with the lowest cost to the group with the highest sum of energy efficiencies. The process of allocating spectrum by the CBS to the FBS groups is illustrated in Algorithm 2.

Algorithm 2: Spectrum Allocation Algorithm for the Non-Interfering Groups of FBSs:

5) Initialization: the set of non-interfering groups $\Omega=\{\Omega_1, \Omega_2, \ldots, \Omega_s\}$, and the set of spectrum bands $\Omega_s=\{1, 2, \ldots, S\}$.
6) Set s=1.
7) Do repeat:
   a) Find $v^*=\arg\max_{\forall s}\{\sum_{p \in \Omega_s} \eta_p\}$, then let $x_{1,v^*}=1$,
   b) $\Omega=\Omega-v^*$, and let $\Omega_s=\Omega_s-s$;
   c) s=s+1,
   Until $\Omega_s=\emptyset$, end repeat.
8) Output the spectrum allocation index $x_{1,k}$, k=1, 2, . . . , K It is important to notice here that v* represents a set from $\Omega$ that may contain more than one number corresponding to the non-interfering FBS's. The statement $x_{1,v^*}=1$ means that the spectrum index of all the elements of the set v* will be set to 1. In one embodiment of the present disclosure it is assumed that the indices of the spectrum bands are according to their costs (i.e. the band with the lowest cost will get the lowest index).

Figure 4:
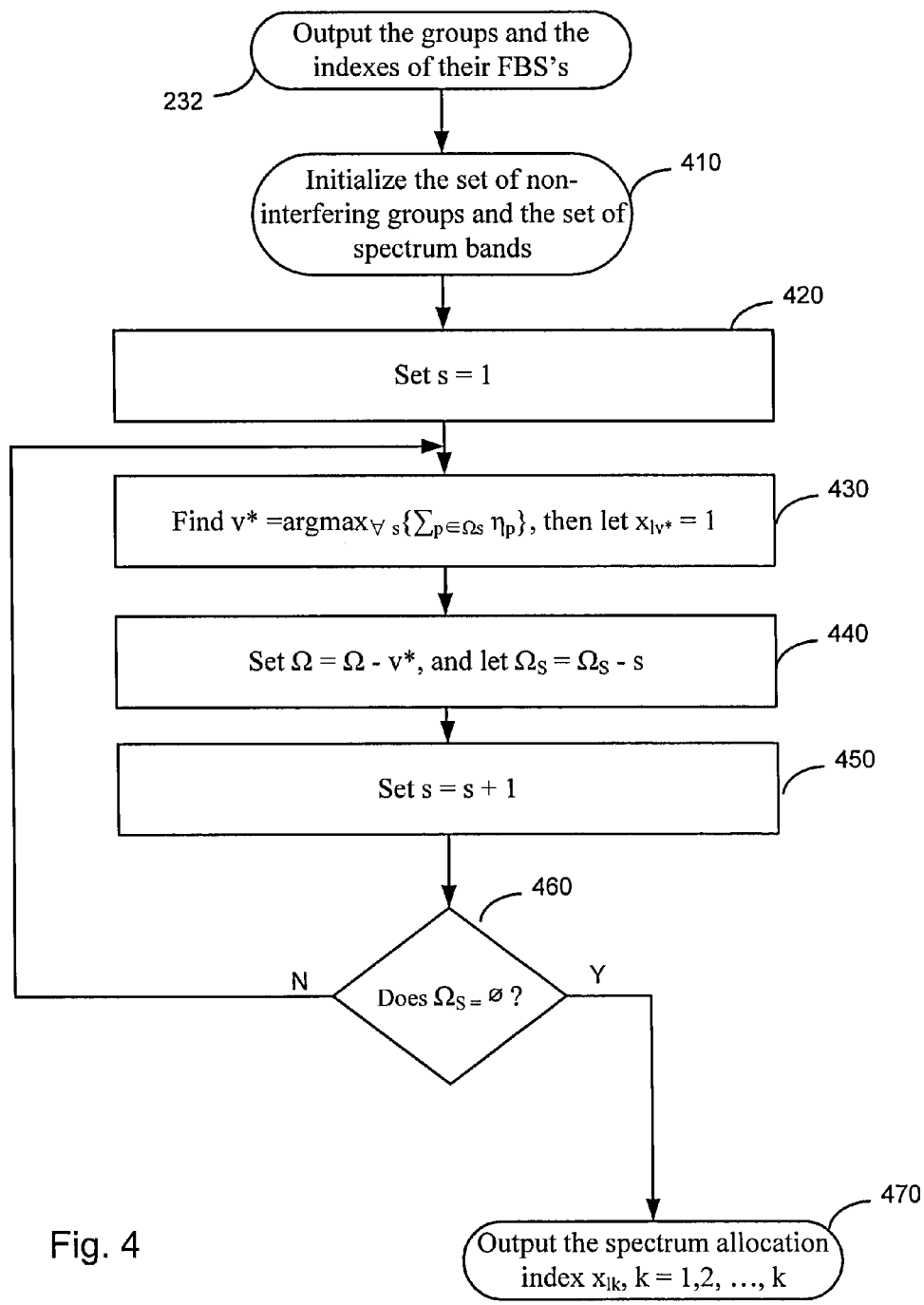
FIG. 4 illustrates a flow chart to determine spectrum allocation for non-interfering groups of femtocells.

FIG. 4 depicts a flowchart outlining an exemplary embodiment of the spectrum allocation process utilized by the cognitive radio network base station (CBS).

The spectrum allocation process begins where the grouping process ended; at step 232. After the system outputs the groups and the indices of their FBSs, the system initializes the set of non-interfering groups and the set of spectrum bands to be allocated those groups, in step 410. In step 420, the group (s) is initialized to be a value of one to be later incremented to account for all the groups. In step 430, as discussed above, the v* is determined such that the spectrum index of all the elements can be determined. In step 440, the value of the non-interfering groups is set to the original number of non-interfering groups minus v* which represents a set from the $\Omega$ that may contain more than one number corresponding to the non-interfering FBSs. Step 450 increments the process and allows for further determination of the values. In step 460, if $\Omega_s=\emptyset$ the system outputs the spectrum allocation index for all groups. However, if $\Omega_s \neq \emptyset$, then the process is repeated at step 430 until $\Omega_s=\emptyset$.

The Profit of CBS:

To find the profit of CBS, the present disclosure uses Equation (3) in (R. Xie, F. R. Yu, H. Ji, and Y. Li, "Energy-Efficient Resource Allocation for Heterogeneous Cognitive Radio Networks with Femtocells," IEEE Trans. Wirel. Commun., vol. 11, no. 11, pp. 3910-3920, 2012, incorporated herein by reference), but with some modifications:

For example, in one exemplary embodiment, FBSs and MSUs may not switch among the spectrum. This assumption is used to simplify the equation by excluding the part which corresponds to the price competition because the present disclosure focuses on the spectrum allocation problem.

Furthermore, to completely ignore the price competition between PU networks, the present disclosure assumes each PU network offers the same price per unit spectrum.

Additionally, in the revenue part, the limit of the summation is K+I instead of L, wherein K corresponds to the number of FBSs indicated by the CBS as subscribers, and I corresponds to the number of MSUs also indicated by the CBS as subscribers. It is assumed in the present disclosure that the CBS purchases several channels/bands from each PU network to satisfy the need of the MSU's and the FBS's.

Based on these changes, the total profit of the CBS may be written as $$\pi_b(w) = \sum_{k=1}^{K+I} w\eta_k - \frac{1}{2}(K+I)w^2 - (K+I)cw \qquad (2)$$

After grouping, the limit of the summation, of the cost portion becomes S+I where S is the number of FBS groups. That is, the CBS will get revenue from K+I subscribers, but will pay only for S+I spectrum bands/channels $$\pi_b(w) = \sum_{k=1}^{K+l} w\eta_k - \frac{1}{2}(S+I)w^2 - (S+I)cw \quad (3)$$

To examine the effect of grouping on the profit of the CBS, an experiment using Matlab simulation has been conducted. In the simulation, there is one macrocell, and the FBSs/MSUs are distributed around it randomly using 2D-Poisson process. The simulation parameters are shown in Table 1.

TABLE 1

SIMULATION PARAMETERS

| Parameter | Value |
| --- | --- |
| Macrocell radius | 100 m |
| Femtocell radius | 20 m |
| Carrier frequency band | 2.5 GHz |
| Transmit/Receive antenna gains | 0 dB |
| CBS and FBS antenna pattern | Omnidirectional |
| MSU/FSU maximum transmit power | 25 dBm |
| Noise power | −174 dBm/Hz |
| Additional power consumption | 0.1 W |
| Price of one spectrum band | 6.3 |

A slow fading channel is assumed in a non-limiting example of the present disclosure. The following path loss (including shadowing) models may be used for suburban areas:

Indoor environment, the path loss from the FSU to FBS while both are in the same building (Y. Sun, R. P. Jover, and X. Wang, "Uplink Interference Mitigation for OFDMA Femtocell Networks," *IEEE Trans. Wirel. Commun.*, vol. 11, no. 2, pp. 614-625, February, incorporated herein by reference):

$$L = 38.46 + 20 \log_{10} d + 0.74 d_{in} + X. \quad (4)$$

Outdoor environment, the path loss from the MSU to the CBS:

$$L = 15.3 + 37.6 \log_{10} d + X, \quad (5)$$

where d is the separation (in meters) between the transmitter and the receiver, d is indoor distance in meters, X is a normal random variable representing the shadowing effect with a standard deviation of 8 dB.

FIG. 5 illustrates a sample result of the grouping process. For example, as a general overview, FIG. 5 shows the profit of CBS as a function of the spectrum demand for different value of the threshold distance. It may be easily noticed that applying the grouping process results in a higher profit for CBS regardless of the spectrum demand. It may be also noticed that with the decrease of threshold value, the profit of the CBS increases because of the smaller number of groups resulting from the grouping process.

Looking at FIG. 5 in greater detail, the graph plots the CBS profit vs. the Spectrum demand for four different plots (510, 520, 530 and 540). Plot 510 illustrates the CBS profit as a function of spectrum demand when no grouping is utilized. As can be seen from plot 510, as spectrum demand increases, CBS profits follow a semi-bell curve structure such that at a given spectrum demand point, the CBS profit maximizes and eventually begins to diminish with increase in spectrum demand. Plot 520 illustrates an immediate increase in the CBS profit, wherein the threshold distance $D_{th}$ is predetermined to be at 160 m. Plots 530 and 540 illustrate how a decrease in $D_{th}$ can further increase the profits. For example, reducing the $D_{th}$ to 100 m can yield significantly higher profits from 160 m and reducing $D_{th}$ further to 60 m can yield additional profits.

Achieving low spectrum prices is critical to the success of cognitive radio secondary networks (A. Taparia, T. R. Casey, and H. Hammainen, "Towards a market mechanism for heterogeneous secondary spectrum usage: An evolutionary approach," in 2012 IEEE International Symposium on Dynamic Spectrum Access Networks (DYSPAN), 2012, pp. 142-153, incorporated herein by reference). However, because of collusion games or the penalty put by the PU operators on switching from their channel to the one belonging to another operator (D. Niyato and E. Hossain, "Competitive Pricing for Spectrum Sharing in Cognitive Radio Networks: Dynamic Game, Inefficiency of Nash Equilibrium, and Collusion," IEEE J. Sel. Areas Commun., vol. 26, no. 1, pp. 192-202, 2008, incorporated herein by reference) high price scenarios may be unavoidable for the SU network.

One way to deal with such a problem and to protect secondary user operators is to put laws that limit spectrum prices and encourage competition between operators to sell spectrum. Still, law has been proved to be inefficient in dealing with PU operators behaviors (O. Korcak, T. Alpcan, and G. Iosifidis, "Collusion of operators in wireless spectrum markets," in 2012 10th International Symposium on Modeling and Optimization in Mobile, Ad Hoc and Wireless Networks (WiOpt), 2012, pp. 33-40, incorporated herein by reference). Therefore, it seems more reasonable to think about ways to reduce the required spectrum instead of thinking about reducing prices.

By adding more capabilities to the CBS, the cost of spectrum can be reduced significantly by grouping the FBS's into groups of non-interferers, and purchasing the number of spectrum channels which is enough to serve the groups.

One question to be answered in this context is how to choose the threshold distance. One such answer may be that the minimum possible threshold distance is needed to reduce the number of groups as much as possible. But a smaller threshold distance will result in closer FBS's using the same channel at the same time which may result in severe interference depending on the penetration loss and the number of interferers.

The quality of service (QoS) agreed upon between the SU operator and the SU's should be taken into account by the CBS when choosing the threshold distance. The effect of interference on the performance of the scheme and the choice of the threshold distance can be considered a future path for the present disclosure.

The present disclosure provides a new scheme to reduce the number of spectrum bands/channels to be purchased from the PU network by the SU network. The scheme depends on grouping the FBS's into groups of non-interferers based on the distances between them and allocating spectrum channels to groups based on the sum of their energy efficiencies. The simulations show a significant increase in the profit of CBS as a result of applying the grouping regardless to the spectrum demand of the CBS when compared to the spectrum allocation without grouping.

In one aspect the present disclosure differs from prior by putting the femtocells apart from each other by a distance in one group, and reducing spectrum costs which will result in increasing the CBS profits.

In another aspect the interference mitigation capability of the present disclosure depends on the choice of the threshold distance which represents a minimum separation between the interfering femtocells. Power allocation in the present disclosure is utilized to maximize the energy efficiency, not to mitigate interference.

In one embodiment the method of the present disclosure reduces spectrum costs by serving a group of femtocells, separated by a distance, using the same channel and thus purchasing a smaller number of channels.

In one embodiment of the present disclosure, the spectrum band/channel with the lowest cost is assigned to the group with the highest sum of energy efficiencies to maximize the profit of the CBS.

In another embodiment the grouping process described in the present disclosure is more suitable to be used with spectrum trading because it is a centralized process. That is, the CBS performs grouping, spectrum trading and spectrum allocation.

In one aspect the method of the present disclosure provides energy efficiency of user transmission.

In one embodiment the method of the present disclosure includes how a cluster or a group may be constructed using GPS position information sent by FBS's to the CBS.

In another embodiment the grouping process of the present disclosure is fully automated and no constraint is put on the number of groups/clusters. The only thing that needs to be set in the present disclosure is the threshold distance.

In another embodiment the method of the present disclosure may be implemented in co-channel deployment scenarios, and is designed to be implemented with spectrum trading.

Figure 6:
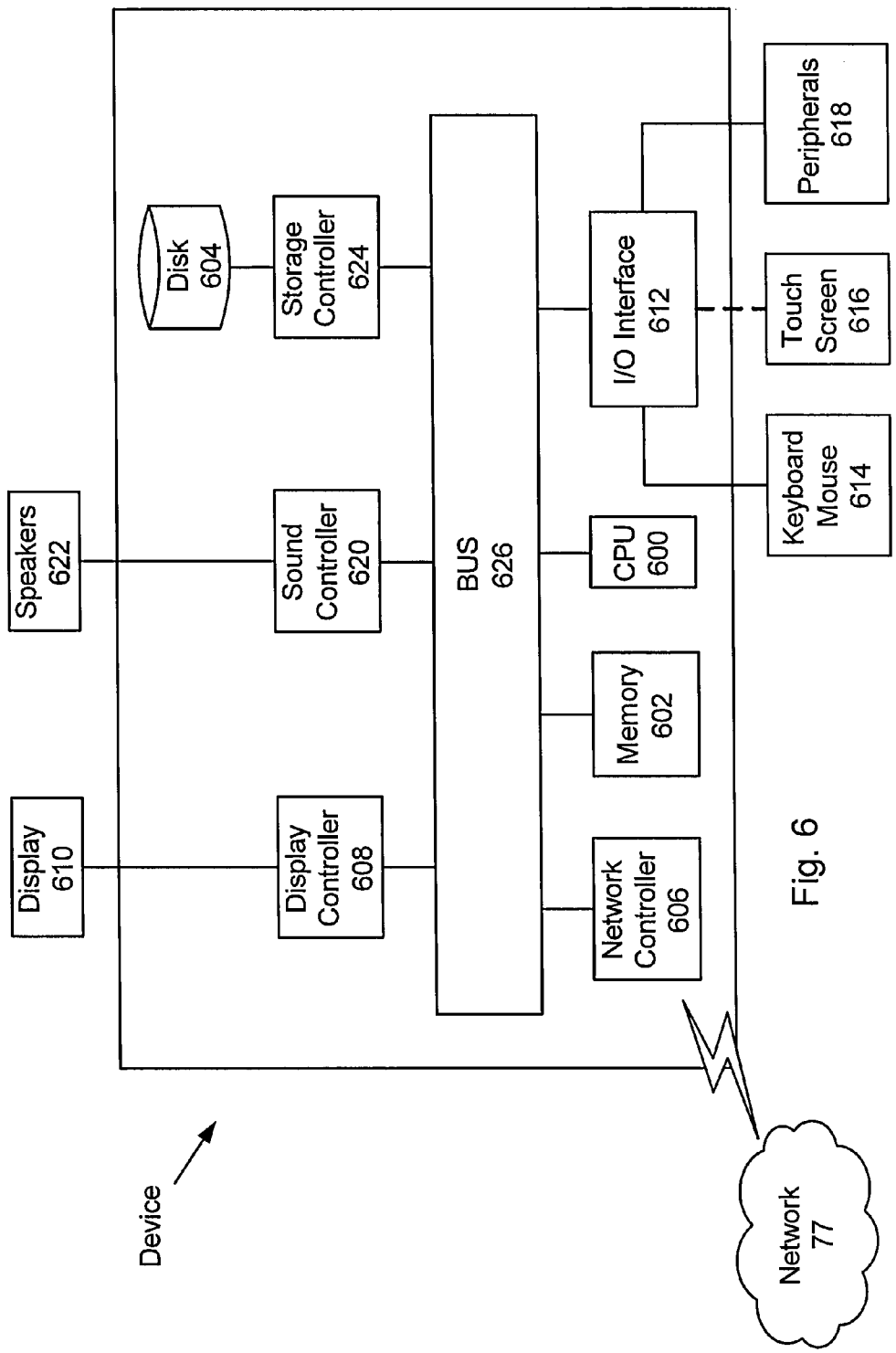
FIG. 6 shows a computer system upon which an embodiment of the present invention may be implemented, according to certain embodiments.

Next, a hardware description of a device, such as a cognitive base station, according to exemplary embodiments illustrated in FIGS. 1-5 is described with reference to FIG. 6. In FIG. 6, the device includes a CPU 600 which performs the processes described above. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 600 and an operating system such as Microsoft Windows 7, UNIX, Solaris, LINUX, Apple MAC-OS and other systems known to those skilled in the art.

CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The device in FIG. 6 also includes a network controller 606, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the device, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Different embodiments include a methods, non-transitory computer-readable storage mediums including computer readable instructions thereon which when executed by a computer cause the computer to perform a method, and an apparatus for mitigating interference and reducing spectrum costs, including initializing at least one ungrouped femtocell base station, initializing a location index corresponding to the location of the ungrouped femtocell base station, initializing a grouping index of the at least one ungrouped femtocell base station to an initial value, initializing a first group and setting the number of FBSs in the initialized first group to the initial value, assigning the at least one ungrouped femtocell base station to the first group, setting the grouping index of the grouped femtocell base station to a non-initial value, selecting at least one other ungrouped femtocell base station for evaluation, assigning the at least one other ungrouped femtocell base station to the first group if the distance between the grouped femtocell base station and the at least one other ungrouped femtocell base station is larger than a threshold distance value, setting a grouping index of the at least one other ungrouped femtocell base station to the non-initial value.

The method may further include assigning the initial value as the grouping index for any selected ungrouped femtocell base station if the distance from the grouped femtocell base station to the selected ungrouped femtocell base station is smaller than the threshold distance value and/or assigning the non-initial value as the grouping index for any selected ungrouped femtocell base station if the distance from the grouped femtocell base station to the selected femtocell base station is larger than the threshold distance value. Furthermore, the method may also include incrementally increasing the number of femtocell base stations in a group as a result of assigning each additional femtocell base station to the group; wherein the total number of femtocell base stations in any given group determines the maximum number of comparisons needed for a next examined femtocell base station. In one embodiment, the method further includes initializing at least one other group, assigning at least one evaluated and ungrouped femtocell base station to the at least one other group, comparing a distance between the at least one evaluated and grouped femtocell base station and at least one other evaluated and ungrouped femtocell base station; and assigning the at least one other evaluated and ungrouped femtocell base station to the at least one other group if the distance between the evaluated and grouped femtocell base station and the at least one other evaluated and ungrouped femtocell base station is larger than the threshold distance value.

The method may further include assigning the same grouping index number as the first grouped femtocell base station to any ungrouped femtocell base station, if, after the comparing, the distance between the first grouped femtocell base station and the ungrouped femtocell base station is larger than the threshold distance. Alternatively, the method mayalso include maintaining the initial grouping index for all ungrouped femtocell base stations if the distance between the first grouped femtocell base station and the ungrouped femtocell base stations is smaller than the threshold distance. Furthermore, the method may further include incrementally increasing the number of femtocell base stations in a group as a result of assigning each additional femtocell base station to the group; wherein the total number of femtocell base stations in any given group determines the maximum number of comparisons needed for the next examined femtocell base station. Alternatively, the method may also include determining whether all femtocell base stations have been examined for the first set of ungrouped femtocell base stations, outputting the groups and grouped femtocell base stations associated with each group and terminating the grouping if all femtocell base stations have been examined, and forming a new group and assign a new femtocell base station to the newly formed group if not all the femtocell base stations have been examined.

In one embodiment, the distances between the ungrouped femtocell base stations is determined by Global Posititioning Systems (GPS), geographic information system (GIS) or triangulation systems embedded within the ungrouped femtocell base stations. Furthermore, the method may also include identifying an effect of the grouping on the spectrum allocation scheme according to a spectrum allocation algorithm, and wherein the algorithm is based on the sum of energy efficiencies of the grouped sets of grouped femtocell base stations. Alternatively, the spectrum allocation scheme is developed by at least one cognitive radio network base station, wherein the interference is mitigated during spectrum allocation of the cognitive radio network base station. Additionally, the at least one cognitive radio network base station is located within a hetergenous coginitive radio network also having a plurality of primary networks, a plurality of grouped femto cell base stations, and a plurality of macrocell secondary users, wherein the plurality of macrocell secondary users are grouped in the initial group index in which each member is allocated an orthognal channel. Furthermore, the cognitive radio network base station obtains a plurality of channels/bands from each primary user network to satisfy the needs of the plurality of macrocell secondary users and the plurality of femto base stations.

In one embodiment, the threshold distance is generated based on a quality of service agreed upon between a secondary user and a secondary user's operator. Furthermore, there may also include accruing a revenue of the profit of the cognitive radio network base station from a plurality of K femtocell base stations and a plurality of I macrocell secondary user subscribers while paying only for a plurality of S non-interfering groups of the plurality of femto base stations and the I plurality of macro secondary user subscribers, wherein K+I>S+I.

The invention claimed is:

1. A method for mitigating interference and reducing spectrum costs, comprising:
   initializing, by a circuitry, at least one ungrouped femtocell base station;
   initializing, by the circuitry, a location index corresponding to the location of the ungrouped femtocell base station;
   initializing, by the circuitry, a grouping index of the at least one ungrouped femtocell base station to an initial value;
   initializing, by the circuitry, a first group and setting a number of femtocell base stations in the initialized first group to the initial value;
   assigning, by circuitry, the at least one ungrouped femtocell base station to the first group to be a grouped femtocell base station;
   setting, by the circuitry, the grouping index of the grouped femtocell base station to a non-initial value;
   selecting, by the circuitry, at least one other ungrouped femtocell base station for evaluation;
   assigning, by the circuitry, the at least one other ungrouped femtocell base station to the first group if the distance between the grouped femtocell base station and the at least one other ungrouped femtocell base station is larger than a threshold distance value; and
   setting, by the circuitry, a grouping index of the at least one other ungrouped femtocell base station to the non-initial value.

2. The method of claim 1, further comprising:
   developing a spectrum allocation algorithm using one or more grouped femtocell base stations.

3. The method of claim 1, further comprising:
   assigning the initial value as the grouping index for any selected ungrouped femtocell base station if the distance between the grouped femtocell base station and the selected ungrouped femtocell base station is smaller than the threshold distance value.

4. The method of claim 1, further comprising:
   assigning the non-initial value as the grouping index for any selected ungrouped femtocell base station if the distance between the grouped femtocell base station and the selected femtocell base station is larger than the threshold distance value.

5. The method of claim 4, further comprising:
   incrementally increasing a number of femtocell base stations in a group as a result of assigning each additional femtocell base station to the group; wherein a total number of femtocell base stations in any given group determines the maximum number of comparisons needed for a next examined femtocell base station.

6. The method of claim 1, further comprising:
   initializing at least one other group;
   assigning at least one evaluated and ungrouped femtocell base station to the at least one other group;
   comparing a distance between the at least one evaluated and grouped femtocell base station and at least one other evaluated and ungrouped femtocell base station; and
   assigning the at least one other evaluated and ungrouped femtocell base station to the at least one other group if the distance between the evaluated and grouped femtocell base station and the at least one other evaluated and ungrouped femtocell base station is larger than the threshold distance value.

7. The method of claim 1, wherein the distances between the ungrouped femtocell base stations is determined by Global Positioning Systems (GPS), geographic information system (GIS) or triangulation systems embedded within the ungrouped femtocell base stations.

8. The method of claim 1, further comprising:
identifying an effect of the grouping on a spectrum allocation according to a spectrum allocation algorithm.

9. The method of claim 8, wherein the spectrum allocation algorithm is based on a sum of energy efficiencies of grouped sets of grouped femtocell base stations.

10. The method of claim 2, wherein the spectrum allocation algorithm is developed by at least one cognitive radio network base station.

11. The method of claim 10, wherein an interference is mitigated during spectrum allocation of the at least one cognitive radio network base station.

12. The method of claim 11, wherein the at least one cognitive radio network base station is located within a hetergenous cognitive radio network also having a plurality of primary networks, a plurality of grouped femtocell base stations, and a plurality of macrocell secondary users.

13. The method of claim 12, wherein the plurality of macrocell secondary users are grouped under the initial value group index and wherein each member is allocated an orthogonal channel.

14. The method of claim 12, wherein the cognitive radio network base station obtains a plurality of channels/bands from each primary user network to meet spectrum requirements of the plurality of macrocell secondary users and the plurality of femtocell base stations.

15. The method of claim 1, wherein the threshold distance value is generated based on a quality of service determined between a secondary user and the secondary user's operator.

16. The method of claim 1, further comprising:
accruing a revenue of a profit of a cognitive radio network base station from a plurality of K femtocell base stations and a plurality of I macrocell secondary user subscribers while paying only for a plurality of S non-interfering groups of the plurality of femto base stations and the I plurality of macro cell secondary user subscribers, wherein K+I>S+I.

17. The method of claim 1, further comprising:
serving a group of femtocell base stations that are separated by a threshold distance;
providing a channel per served group of femtocell base stations such that the group uses the same channel; and
assigning the channel with a lowest cost to the group having the highest sum of energy efficiency to maximize spectrum profits of a cognitive radio network base station.

18. A non-transitory computer-readable storage medium including computer readable instructions thereon which when executed by a computer cause the computer to perform a method of mitigating interference and reducing spectrum costs resulting from a co-existence of a plurality of femtocells and a plurality of macrocells, the method comprising:
initializing at least one ungrouped femtocell base station;
initializing a location index corresponding to the location of the ungrouped femtocell base station;
initializing a grouping index of the at least one ungrouped femtocell base station to an initial value;
initializing a first group and setting the number of FBSs in the initialized first group to the initial value;
assigning the at least one ungrouped femtocell base station to the first group;
setting the grouping index of the grouped femtocell base station to a non-initial value;
selecting at least one other ungrouped femtocell base station for evaluation;
assigning the at least one other ungrouped femtocell base station to the first group if the distance between the grouped femtocell base station and the at least one other ungrouped femtocell base station is larger than a threshold distance value; and
setting a grouping index of the at least one other ungrouped femtocell base station to the non-initial value.

19. The non-transitory computer-readable storage medium of claim 18, further comprising:
initializing at least one other group;
assigning at least one evaluated and ungrouped femtocell base station to the at least one other group;
comparing a distance between the at least one evaluated and grouped femtocell base station and at least one other evaluated and ungrouped femtocell base station; and
assigning the at least one other evaluated and ungrouped femtocell base station to the at least one other group if the distance between the evaluated and grouped femtocell base station and the at least one other evaluated and ungrouped femtocell base station is larger than the threshold distance value.

20. A radio network comprising:
circuitry configured to:
initialize at least one ungrouped femtocell base station;
initialize a location index corresponding to the location of the ungrouped femtocell base station;
initialize a grouping index of the at least one ungrouped femtocell base station to an initial value;
initializing a first group and setting the number of FBSs in the initialized first group to the initial value;
assign the at least one ungrouped femtocell base station to the first group;
set the grouping index of the grouped femtocell base station to a non-initial value;
select at least one other ungrouped femtocell base station for evaluation;
assign the at least one other ungrouped femtocell base station to the first group if the distance between the grouped femtocell base station and the at least one other ungrouped femtocell base station is larger than a threshold distance value; and
set a grouping index of the at least one other ungrouped femtocell base station to the non-initial value.

* * * * *